United States Patent
Colgrove et al.

(10) Patent No.: US 7,653,699 B1
(45) Date of Patent: Jan. 26, 2010

(54) SYSTEM AND METHOD FOR PARTITIONING A FILE SYSTEM FOR ENHANCED AVAILABILITY AND SCALABILITY

(75) Inventors: John A. Colgrove, Los Altos, CA (US); Tushar Y. Tambay, Cupertino, CA (US); Dheer Moghe, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 853 days.

(21) Appl. No.: 10/460,148

(22) Filed: Jun. 12, 2003

(51) Int. Cl.
*G06F 15/167* (2006.01)
*G06F 12/00* (2006.01)

(52) U.S. Cl. ............... 709/213; 709/214; 709/215; 709/216; 707/200; 707/204; 707/205

(58) Field of Classification Search ......... 709/212–219, 709/201, 202, 203; 707/100–102, 200–205
See application file for complete search history.

(56) References Cited

U.S. PATENT DOCUMENTS

| | | | |
|---|---|---|---|
| 5,257,367 A * | 10/1993 | Goodlander et al. ........ 707/204 |
| 5,721,916 A * | 2/1998 | Pardikar ................ 707/201 |
| 5,832,512 A | 11/1998 | Mastors et al. |
| 5,893,086 A * | 4/1999 | Schmuck et al. .............. 707/1 |
| 5,893,919 A * | 4/1999 | Sarkozy et al. .............. 711/114 |
| 6,173,293 B1 | 1/2001 | Thekkath et al. |
| 6,324,581 B1 * | 11/2001 | Xu et al. .................... 709/229 |
| 6,324,627 B1 * | 11/2001 | Kricheff et al. ............. 711/163 |
| 6,385,706 B1 | 5/2002 | Ofek et al. |
| 6,487,561 B1 | 11/2002 | Ofek et al. |
| 6,687,701 B2 | 2/2004 | Karamanolis et al. |
| 6,697,846 B1 * | 2/2004 | Soltis ........................ 709/217 |
| 6,732,124 B1 * | 5/2004 | Koseki et al. ............... 707/202 |
| 6,742,020 B1 * | 5/2004 | Dimitroff et al. ............ 709/217 |
| 6,775,679 B2 * | 8/2004 | Gupta ........................ 707/102 |
| 6,782,389 B1 * | 8/2004 | Chrin et al. .................... 707/10 |
| 6,823,436 B2 | 11/2004 | Krishnamurthy |
| 6,829,688 B2 * | 12/2004 | Grubbs et al. ............... 711/162 |
| 6,868,429 B2 | 3/2005 | Fontijn |
| 6,889,309 B1 * | 5/2005 | Oliveira et al. .............. 711/203 |
| 6,976,060 B2 * | 12/2005 | Manczak et al. ............ 709/219 |
| 7,305,393 B2 * | 12/2007 | Seeger et al. .................... 707/9 |

(Continued)

OTHER PUBLICATIONS

S. Gopalakrishnan, A. Arumugam and L. Iftode, "Federated File Systems for Clusters with Remote Memory Communication," Apr. 3, 2002.*

(Continued)

*Primary Examiner*—Ario Etienne
*Assistant Examiner*—Brendan Y Higa
(74) *Attorney, Agent, or Firm*—Meyertons, Hood, Kivlin, Kowert & Goetzel, P.C.

(57) ABSTRACT

A method and system are provided for partitioning a file system. The system may include one or more server computer systems and a plurality of physical file systems. The physical file systems may be hosted by the one or more server computer systems. The physical file systems may be accessible to clients through a virtual file system having a single namespace. The virtual file system may include metadata which are partitioned across the plurality of physical file systems. The server computer systems may be configured to independently perform file system consistency checks on each of the physical file systems, in order to independently validate each partition of the metadata.

18 Claims, 10 Drawing Sheets

U.S. PATENT DOCUMENTS

| | | | |
|---|---|---|---|
| 7,406,484 B1 * | 7/2008 | Srinivasan et al. | 707/200 |
| 7,430,570 B1 * | 9/2008 | Srinivasan et al. | 707/204 |
| 7,546,319 B1 * | 6/2009 | Srinivasan et al. | 707/200 |
| 2002/0156973 A1 * | 10/2002 | Ulrich et al. | 711/114 |
| 2002/0188697 A1 * | 12/2002 | O'Connor | 709/219 |
| 2003/0140051 A1 * | 7/2003 | Fujiwara et al. | 707/100 |
| 2003/0158863 A1 * | 8/2003 | Haskin et al. | 707/200 |
| 2003/0217119 A1 * | 11/2003 | Raman et al. | 709/219 |
| 2003/0220923 A1 * | 11/2003 | Curran et al. | 707/8 |
| 2004/0030731 A1 * | 2/2004 | Iftode et al. | 707/205 |
| 2004/0122917 A1 * | 6/2004 | Menon et al. | 709/219 |

OTHER PUBLICATIONS

Newton's Telecom Dictionary, 18th ed., Feb. 2002.*

"Scale Eight™ Global Storage Service" 2002.

"Lustre: A Scalable, High-Performance File System," Cluster File Systems, Inc., Nov. 2002.

* cited by examiner

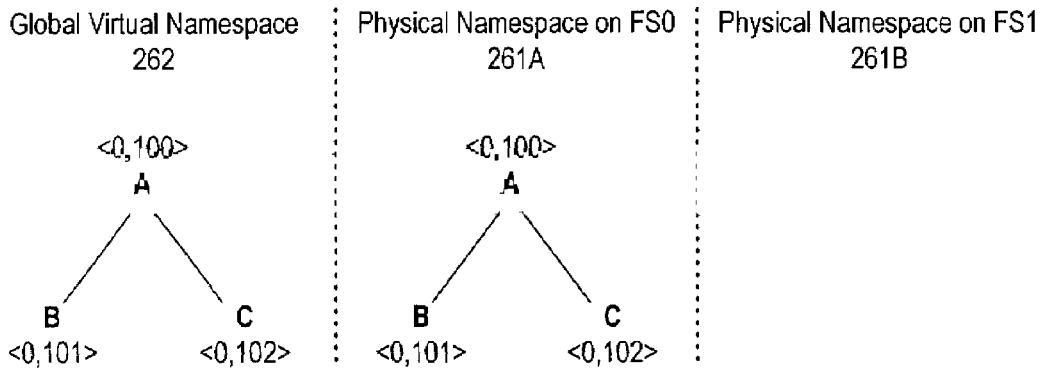
Figure 9A - All Local Directories
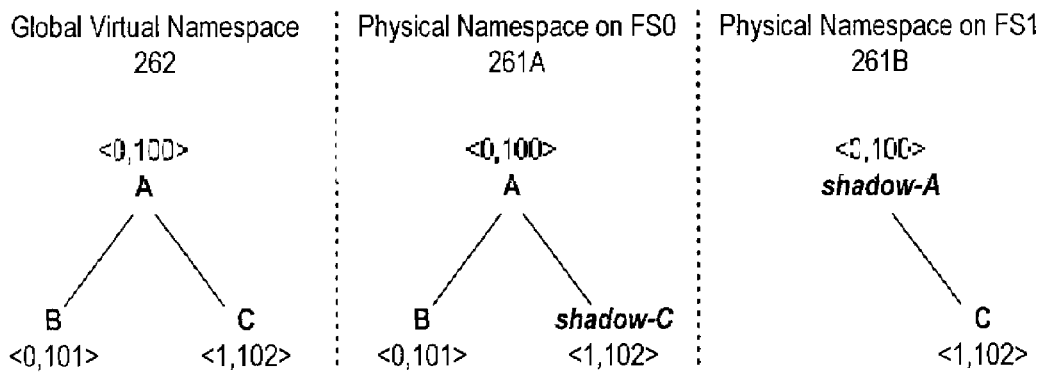
Figure 9B - Remote Directory due to Virtualization
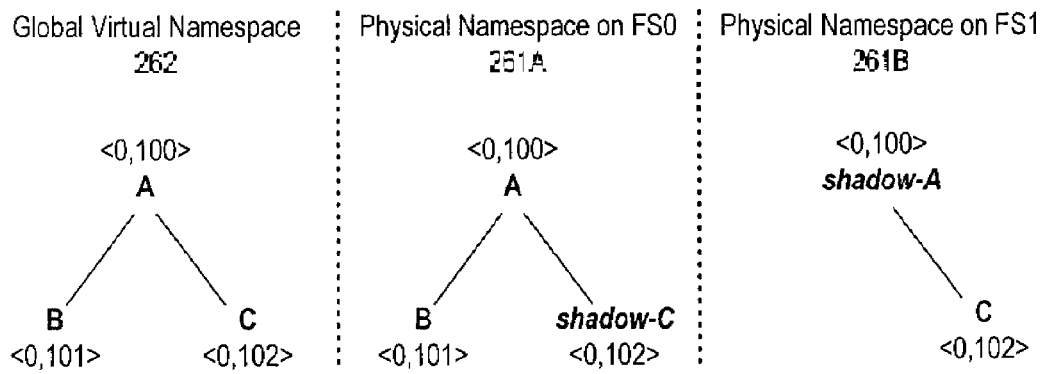
Figure 9C - Remote Directory After Migration

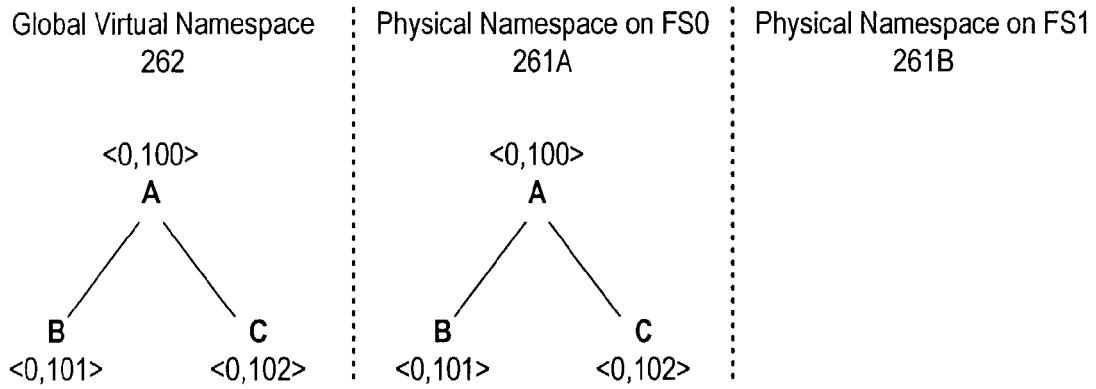
Figure 9D - All Local Directories
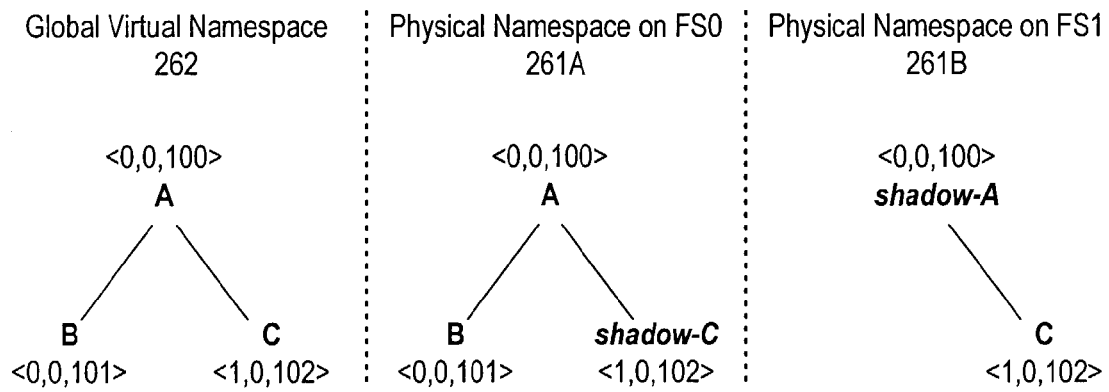
Figure 9E - Remote Directory After Migration

SYSTEM AND METHOD FOR PARTITIONING A FILE SYSTEM FOR ENHANCED AVAILABILITY AND SCALABILITY

BACKGROUND OF THE INVENTION

1. Field of the Invention

This invention is related to the field of storage management and, more particularly, to management of distributed storage in a multi-server environment.

2. Description of the Related Art

In the file serving and network storage environments, two trends are emerging. The first trend is a movement away from storage being directly attached to servers and towards storage being network attached. In some configurations, this network-attached storage may be directly accessible by clients. Enterprise computing environments are increasingly using configurations such as computer clusters, Storage Area Networks (SANs), Network Attached Storage (NAS), and other centralized storage mechanisms to simplify storage, improve availability, and handle escalating demands for data and applications.

Clustering may be defined as the use of multiple computers (e.g., PCs or UNIX workstations), multiple storage devices, and redundant interconnections to form what appears to external users as a single and highly available system. Clustering may be used for load balancing and parallel processing as well as for high availability.

The storage area network (SAN) model places storage on its own dedicated network, removing data storage from the main user network. This dedicated network most commonly uses Fibre Channel technology as a versatile, high-speed transport. The SAN includes one or more hosts that provide a point of interface with LAN users, as well as (in the case of large SANs) one or more fabric switches, SAN hubs and other devices to accommodate a large number of storage devices. The hardware (e.g. fabric switches, hubs, bridges, routers, cables, etc.) that connects workstations and servers to storage devices in a SAN is referred to as a "fabric." The SAN fabric may enable server-to-storage device connectivity through Fibre Channel switching technology to a wide range of servers and storage devices.

The versatility of the SAN model enables organizations to perform tasks that were previously difficult to implement, such as LAN-free and server-free tape backup, storage leasing, and full-motion video services. SAN deployment promises numerous advantages, including cost management through storage consolidation, higher availability of data, better performance and seamless management of online and offline data. In addition, the LAN is relieved of the overhead of disk access and tape backup, data availability becomes less server-dependent, and downtime incurred by service and maintenance tasks affects more granular portions of the available storage system.

Of the two storage management trends, the trend is a movement away from deploying expensive high end servers towards deploying server appliances which include an aggregation of inexpensive server modules. These server modules are typically not of very high capacity, but the appliance can be scaled to meet the performance requirements by aggregating multiple such modules. Customers may start with a configuration which meets their current requirements and later add capacity as needed. To minimize administrative overhead, such an appliance may look and behave like a traditional file server.

Nevertheless, these new trends are not without problems of their own. Due to the tightly coupled nature of a cluster, for example, client machines are typically not configured to be part of the cluster itself. Therefore, in a cluster-based appliance, file system clients do not get direct access to file data and are instead served this data by one of the server nodes using standard protocols such as NFS or CIFS. Moreover, since there is only one node (the primary) doing metadata operations, that node may quickly become the bottleneck as the load on the file system grows. Even though a large number of clients may directly access user data, metadata operations are typically still handled by a single server. This single metadata server is likely to become a bottleneck.

This metadata bottleneck may be present in other network storage configurations, and it may limit the usability of large file systems. For example, extremely large file systems may demand unacceptably large times for file system consistency check ("fsck") operations. In some instances, an entire file system may be offline for hours while undergoing an fsck operation. It is therefore desirable to improve the performance and availability of file systems during file system metadata operations such as consistency checks.

SUMMARY OF THE INVENTION

Various embodiments of a method and system for partitioning a file system are disclosed. In one embodiment, the system may include one or more server computer systems and a plurality of physical file systems. The physical file systems may be hosted by the one or more server computer systems. The physical file systems may be accessible to clients through a virtual file system having a namespace. The virtual file system may include metadata which are partitioned across the plurality of physical file systems. In one embodiment, the server computer systems may be configured to independently perform file system consistency checks on each of the physical file systems, in order to independently validate each partition of the metadata.

BRIEF DESCRIPTION OF THE DRAWINGS

FIGS. 9A, 9B, and 9C illustrate examples of virtualization and migration of inodes in a partitioned file system according to one embodiment.

FIGS. 9D and 9E illustrate an example of migration of inodes in a partitioned file system according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
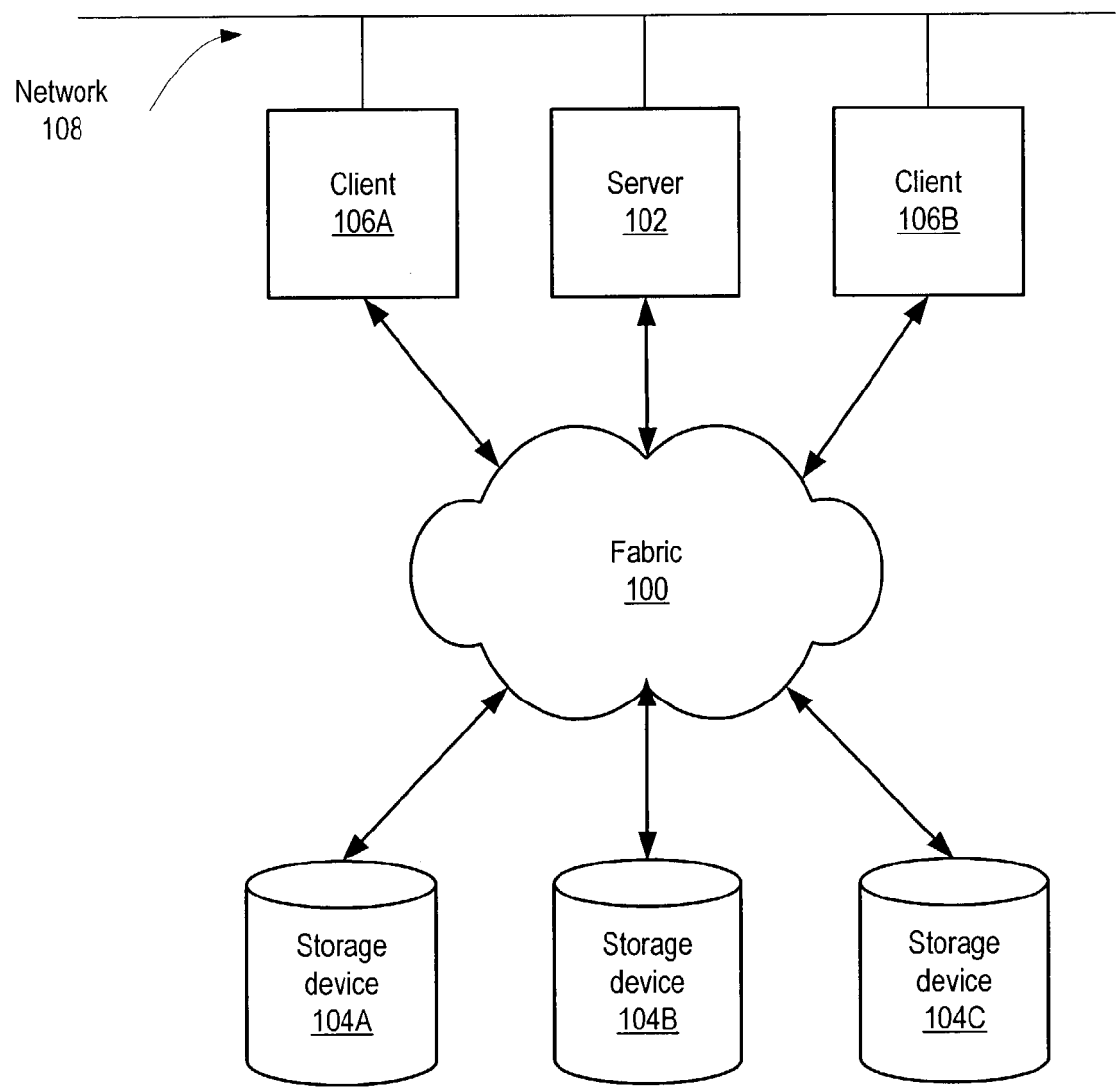
FIG. 1 illustrates an exemplary enterprise computing system with which embodiments of a system and method for partitioning a file system may be implemented.

FIG. 1 illustrates an exemplary enterprise computing system with which embodiments of a system and method for partitioning a file system may be implemented. Although FIG. 1 will be discussed herein in the context of a Storage Area Network (SAN) environment, the configuration shown in FIG. 1 is meant to be an exemplary embodiment of a networked storage configuration. Other networked storage configurations, including (but not limited to) a cluster, a NAS (Network Attached Storage) system, and other SAN configurations, may be used with embodiments of the system and method for partitioning a file system as described herein.

In one embodiment, the SAN may be described as a high-speed, special-purpose network that interconnects one or more storage devices 104 (e.g. storage devices 104A, 104B, and 104C) with one or more associated host systems or servers 102 on behalf of a larger network of users. This dedicated network may employ Fibre Channel technology. A SAN may be part of the overall network of computing resources for an enterprise or other entity. The one or more servers 102 and one or more storage devices 104 (e.g. storage devices 104A, 104B, and 104C) may be coupled via a fabric 100. One or more client systems 106 may access the SAN by accessing one or more of the servers 102 via a network 108. The client systems 106 may communicate with the server 102 to access data on the storage devices 104A, 104B, and 104C which are managed by server 102. The client systems 106 may comprise server systems which manage a different set of storage devices. The client systems 106 may therefore also act as servers and may be coupled to other storage devices (not shown) through the fabric 100. As will be discussed further (e.g., with reference to FIGS. 3 through 10), the server(s) 102 may present a single, global namespace to the clients 106, wherein the global namespace includes the individual namespaces from storage devices 104.

Network 108 may include wired or wireless communications connections separate from the Fibre Channel network. For example, network 108 is representative of any local area network (LAN) such as an intranet or any wide area network (WAN) such as the Internet. Network 108 may use a variety of wired or wireless connection mediums. For example, wired mediums may include: a modem connected to "plain old telephone service" (POTS), Ethernet, and fiber channel. Wireless connection mediums include a satellite link, a modem link through a cellular service or a wireless link such as Wi-Fi™, for example.

Storage devices may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Clients 106 and server 102 may run any of a variety of operating systems, including, but not limited to, Solaris 2.6, 7 or 8, Microsoft Windows NT 4.0 (Server and Enterprise Server), Microsoft Windows 2000 (Server, Advanced Server and Datacenter Editions), and various versions of HP-UX. Each server 102 may be connected to the fabric 100 via one or more Host Bus Adapters (HBAs).

The hardware that connects servers 102 to storage devices 104 in a SAN may be referred to as a fabric 100. The fabric 100 enables server-to-storage device connectivity through Fibre Channel switching technology. The fabric 100 hardware may include one or more switches (also referred to as fabric switches), bridges, hubs, or other devices such as routers, as well as the interconnecting cables (for Fibre Channel SANs, fibre optic cables). Fabric 100 may include one or more distinct device interconnection structures (e.g. Fibre Channel Arbitrated Loops, Fibre Channel Fabrics, etc.) that collectively form the fabric 100.

In one embodiment, a SAN-aware file system may use the Network File System (NFS) protocol in providing access to shared files on the SAN. Using NFS, each server 102 may include a logical hierarchy of files (i.e., a directory tree) physically stored on one or more of storage devices 104 and accessible by the client systems 106 through the server 102. These hierarchies of files, or portions or sub-trees of the hierarchies of files, may be referred to herein as "file systems." In one embodiment, the SAN components may be organized into one or more clusters to provide high availability, load balancing and/or parallel processing. For example, in FIG. 1, server 102 and clients 106A and 106B may be in a cluster.

In traditional storage architecture, each server is privately connected to one or more storage devices using SCSI or other storage interconnect technology. If a server is functioning as a file server, it can give other servers (its clients) on the network access to its locally attached files through the local area network. With a storage area network, storage devices are consolidated on their own high-speed network using a shared SCSI bus and/or a fibre channel switch/hub. A SAN is a logical place to host files that may be shared between multiple systems.

A shared storage environment is one in which multiple servers may access the same set of data. A common architecture for sharing file-based storage is the File Server architecture, for example, the SAN environment illustrated in FIG. 1. In the File Server architecture, one or more servers are connected to a large amount of storage (either attached locally or in a SAN) and provide other systems access to this storage.

Figure 2:
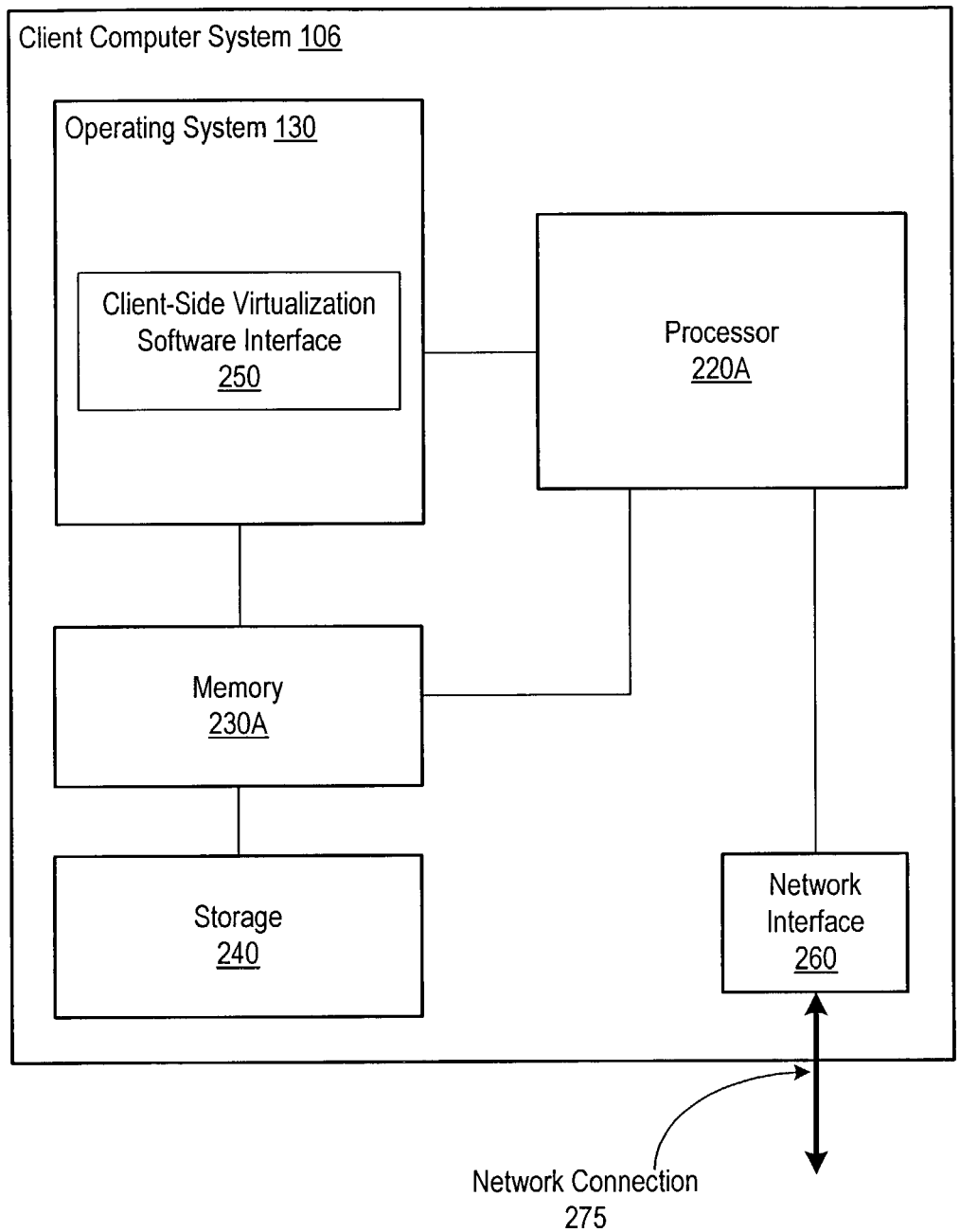
FIG. 2 illustrates an exemplary client computer system with which embodiments of a system and method for partitioning a file system may be implemented.

FIG. 2 illustrates an exemplary client computer system ("client") 106 with which embodiments of a system and method for partitioning a file system may be implemented. Using the system and method for partitioning a file system as will be further described (e.g., with reference to FIGS. 3 through 10), the client 106 may access a global namespace which includes a plurality of individual namespaces. Generally speaking, the client computer system 106 may include various hardware and software components. In the illustrated embodiment, the client computer system 106 includes a processor 220A coupled to a memory 230 which is in turn coupled to storage 240. In addition, processor 220A is coupled to a network interface 260. The client computer system 106 may be connected to a network such as network 108 via a network connection 275. Further, the client computer system 106 includes operating system software 130. The operating system software 130 is executable by processor 220A out of memory 230A, typically to perform basic tasks (e.g., input/output tasks). The operating system software 130 may include client-side virtualization software 250 as will be discussed in greater detail below. In another embodiment, the client-side virtualization software 250 may logically reside on top of the operating system software 130.

Processor 220A may be configured to execute instructions and to operate on data stored within memory 230A. In one embodiment, processor 220A may operate in conjunction with memory 230A in a paged mode, such that frequently used pages of memory may be paged in and out of memory 230A from storage 240 according to conventional techniques. It is noted that processor 220A is representative of any type of processor. For example, in one embodiment, processor 220A may be compatible with the x86 architecture, while in another embodiment processor 220A may be compatible with the SPARC™ family of processors.

Memory 230A is configured to store instructions and data. In one embodiment, memory 230A may be implemented in various forms of random access memory (RAM) such as dynamic RAM (DRAM) or synchronous DRAM (SDRAM). However, it is contemplated that other embodiments may be implemented using other types of suitable memory.

Storage 240 is configured to store instructions and data. Storage 240 is illustrative of any type of mass storage device or system. For example, in one embodiment, storage 240 may be implemented as one or more hard disks configured independently or as a disk storage system. In one embodiment, the disk storage system may be a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 240 may include tape drives, optical storage devices or RAM disks, for example.

Network interface 260 may implement functionality to connect the client computer system 106 to a network such as network 108 via network connection 275. For example, network interconnect 260 may include a hardware layer and a software layer which controls the hardware layer. The software may be executable by processor 220A out of memory 230A to implement various network protocols such as TCP/IP and hypertext transport protocol (HTTP), for example.

While FIGS. 1 and 2 illustrate typical computer system and network storage architectures in which embodiments of the system and method for partitioning a file system as described herein may be implemented, embodiments may be implemented in other computer and network storage architectures.

Figure 3:
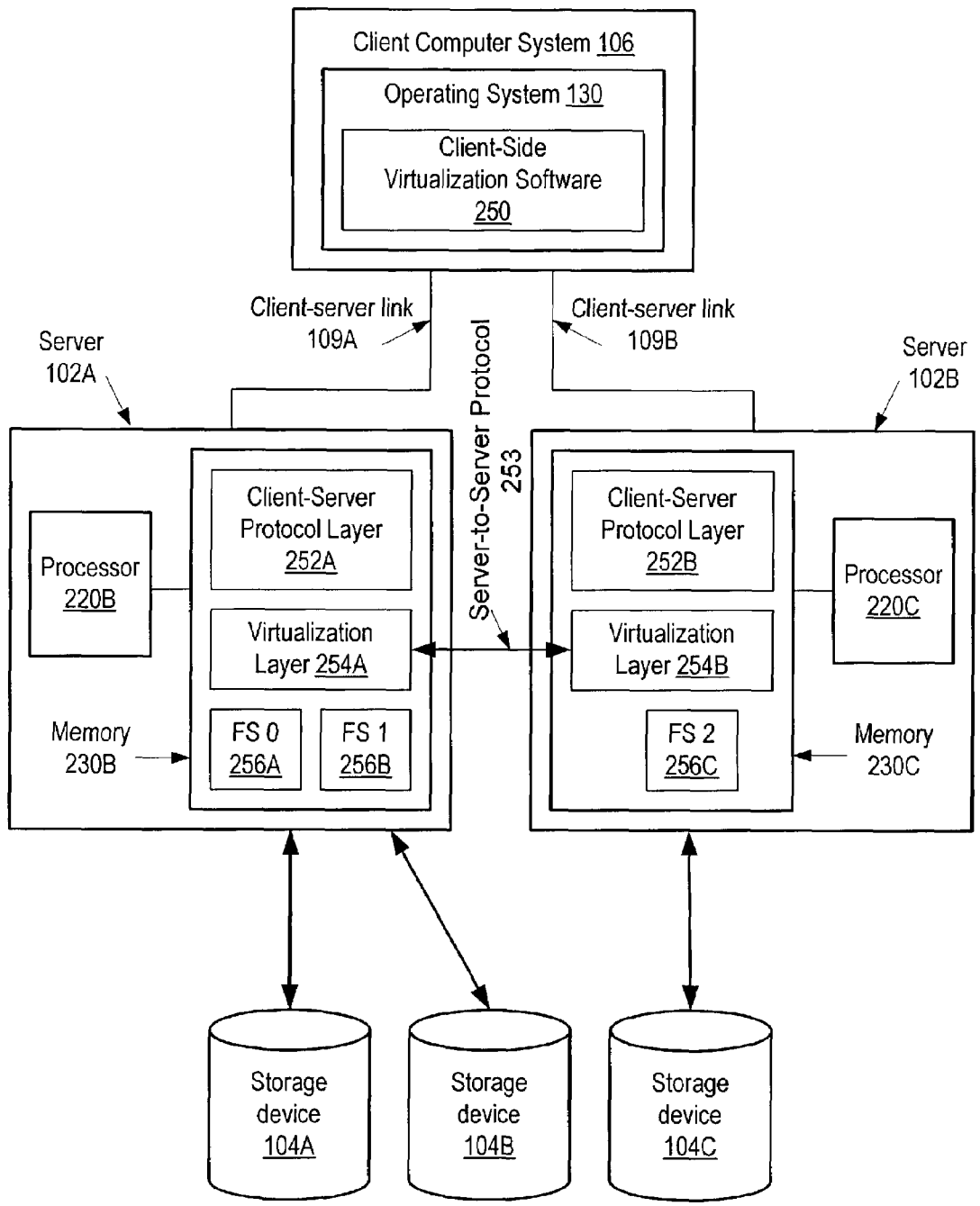
FIG. 3 illustrates an architecture of software and/or hardware components of computer systems configured to provide and access a virtual file system according to one embodiment.

FIG. 3 illustrates an architecture of software and/or hardware components of computer systems configured to provide and access a virtual file system according to one embodiment. In a file server environment, as the size of the file system grows and the load on the file system increases, a single server managing all the metadata operations for a given file system is likely to become a bottleneck. Because the load on a file system is a result of operations done on objects (e.g., files) in its namespace, it may be assumed that by partitioning the namespace of a file system amongst multiple servers 102, the load on the file system may also be partitioned.

In one embodiment, the file system metadata load is distributed amongst a plurality of servers 102 by partitioning the namespace of a file system amongst those servers while maintaining a single file system image and semantics. This approach for improving file system metadata scalability may be referred to generally as namespace virtualization. As the file system grows in size, and as the number of clients 106 increases, this approach allows the enterprise to handle the increased metadata load by adding servers 102 and redistributing the namespace amongst them.

Embodiments of each of the server systems 102A and 102B may be similar to the client system 106 illustrated in FIG. 2. As such, the server system 102A may include a processor 220B coupled to a memory 230B which is in turn coupled to optional storage. Likewise, the server system 102B may include a processor 220C coupled to a memory 230C which is in turn coupled to optional storage. The server computer systems 102A and 102B may be connected to a network via a network connection. In one embodiment, the server computer systems 102A and 102B may include operating system and/or server software which is executable by the respective processors out of the respective memories. Using the operating system software and/or server software, the server systems 102A and 102B may "own" or manage data objects (e.g., files) on one or more storage devices 104. In one embodiment, the server systems 102A and 102B may execute file server software to control access to the data they owns. In another embodiment, the server functionality may be implemented in hardware and/or firmware.

In one embodiment, a file server "appliance," implemented using multiple servers 102 as nodes, may be configured to export a single file system image. The appliance may internally partition the namespace of this file system amongst a plurality of constituent file systems. Responsibility for performing the metadata operations for each file system may be distributed amongst the server nodes 102 of the appliance.

In various embodiments, depending on the particular file system solution that is used, the appliance may be implemented in a variety of ways. In one embodiment, the appliance may comprise a cluster of servers 102 with shared storage 104. File systems may be mounted by more than one server 102, but the primaryship for each file system may be distributed amongst the server nodes 102. Clients 106 may communicate using standard NFS and/or CIFS protocols.

In one embodiment, the appliance may comprise a set of servers 102, where each server 102 manages one or more file systems. Storage may be shared between clients 106 and servers 102. Custom software on the clients 106 may allow direct access to storage. In this case, clients 106 may communicate with servers 102 using proprietary protocols.

In one embodiment, the server 102A and/or server 102B may take the form of a block-server appliance (e.g., on a SAN). Storage devices are usually designed to provide data to servers 102 using one of two methods, either block-level or file-level access. Block I/O is typically the I/O which is tied directly to the disks 104. Block I/O is typically used when direct and fast access to the physical drives themselves is required by the client application. The client 106 may request the data from the block server 102 using the starting location of the data blocks and the number of blocks to be transferred. In one embodiment, the operating system 130 on the client 106 may provide a file system to help translate the block locations into file locations.

In one embodiment, the connections 109A and 109B between the servers 102A and 102B, respectively, and the client 106 may comprise a channel protocol such as SCSI or fibre channel. The channel protocol may also be connected directly to disks or disk controllers (e.g., RAID controllers). SCSI and fibre channel may provide a low latency connection with high performance.

The memory 230B of the server 102A may store instructions which are executable by the processor 220B to implement the method and system for providing a virtual file system as disclosed herein. Likewise, the memory 230C of the server 102B may store instructions which are executable by the processor 220C to implement the method and system for providing a virtual file system as disclosed herein. The instructions may include multiple components or layers. For example, device drivers (not shown) may be used for I/O between the servers 102 and the storage devices 104. A client-server protocol layer 252 may include appropriate communication protocols such as NFS, CIFS, proprietary protocols, and/or other suitable protocols for communication between server and client. A plurality of physical file systems such as file system zero 256A, file system one 256B, and file system two 256C may be hosted by the servers. A virtualization layer 254 may include instructions to export a global, unified namespace including the namespaces of the various physical file systems 256.

In one embodiment, the namespace may be partitioned amongst the file systems in a flexible way, such that the namespace may be repartitioned if the load characteristics change (e.g., one server becomes overloaded). The semantics of a single file system semantics may be maintained for operations involving any file and any directory in the unified namespace. Each constituent file system may manage its namespace in a way that is substantially independently of others. Existing file system facilities like directories, directory operations, inode numbers and inode reference counts may be used. Virtualization-aware clients 106 may understand this layout and may navigate the unified namespace and perform namespace operations. A virtualization protocol 253 between servers may allow namespace operations involving two servers to be completed.

As used herein, a "namespace" refers to an address space in which every address is unique. A "virtual namespace" refers to a higher-level namespace which aggregates a plurality of lower-level namespaces.

Figure 4:
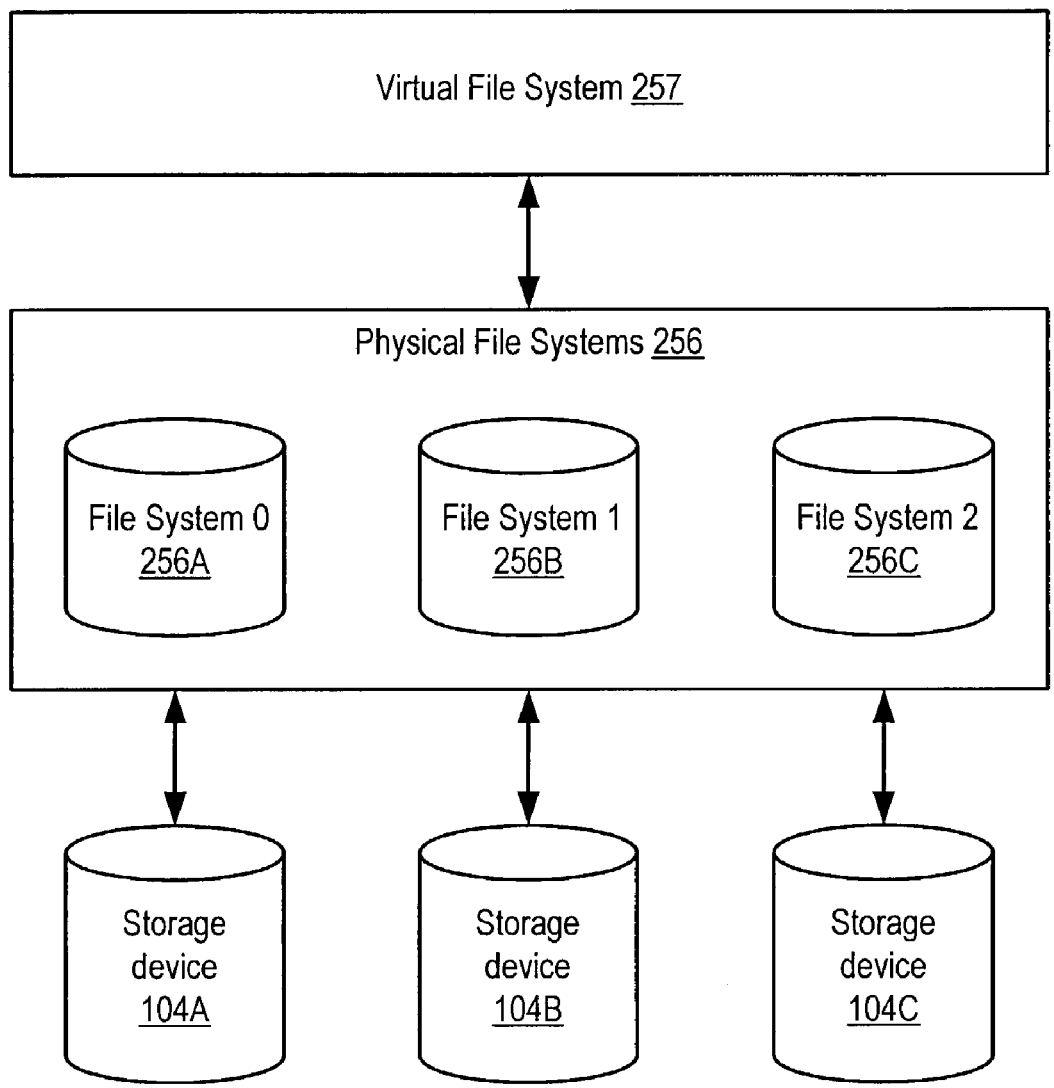
FIG. 4 illustrates a relationship between a virtual file system and underlying physical file systems according to one embodiment.

As used herein, a "physical file system" or "constituent file system" is a traditional file system in which the entire namespace exists on a single volume. As used herein, a "virtual file system" includes a plurality of physical file systems which appear to clients 106 as a single, unified namespace. FIG. 4 illustrates a relationship between a virtual file system 257 and underlying physical file systems 256 according to one embodiment. From the client's point of view, the virtual file system 257 is a single file system and namespace which are served from one server and on which all the traditional file system operations are possible. The namespace is distributed amongst multiple physical file systems 256, possibly on different servers 102. Virtualization software 254 and/or 250 may ensure that this distributed namespace appears as a single connected namespace to clients 106. As used herein, "exporting" a file system or a namespace includes making the file system or namespace usable by one or more clients 106 to perform file system operations.

Figure 5:
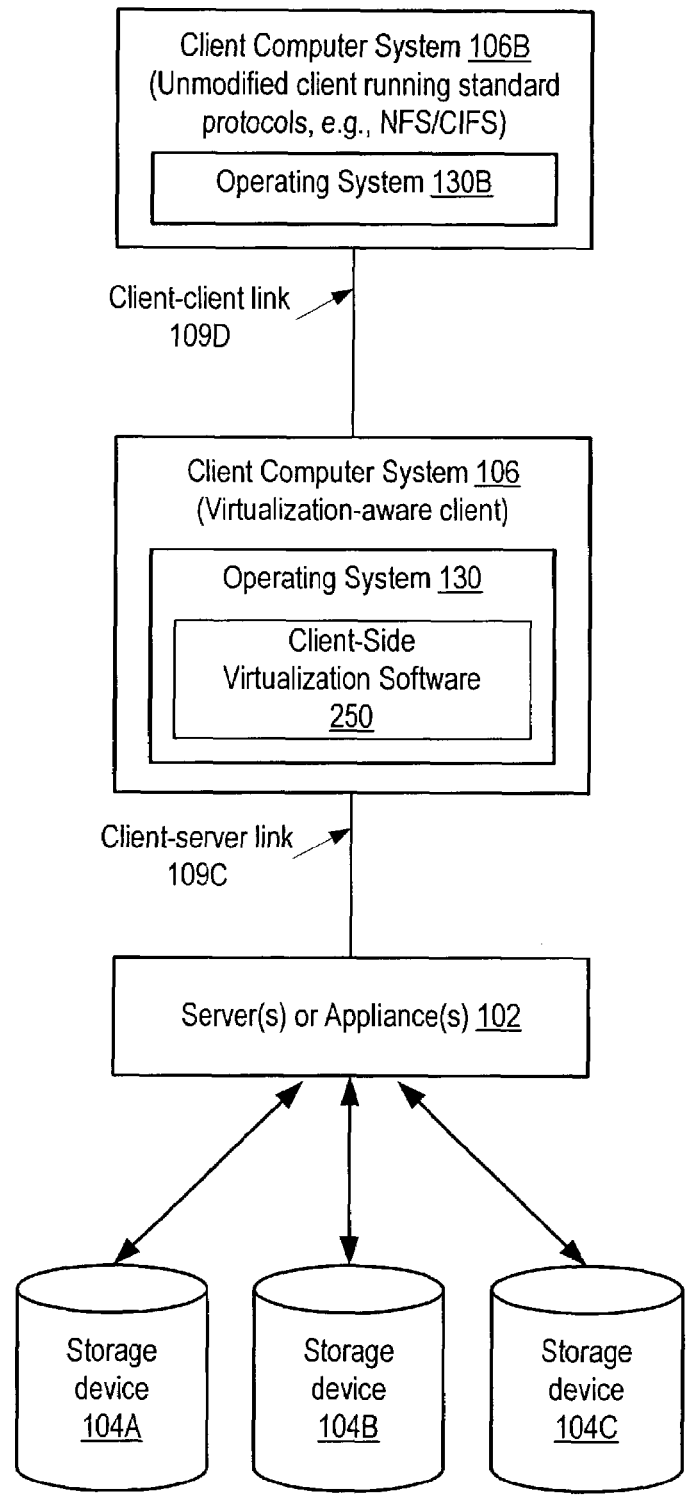
FIG. 5 illustrates an exemplary configuration of a client which is configured to re-export a virtual file system according to one embodiment.

For a namespace distributed over a set of servers 102, it may be desirable for clients 106 to select which servers 102 to communicate with, depending on what part of the namespace the clients 106 are accessing. To accomplish this selection, the clients 106 may run client-side namespace virtualization software 250 which permits the selection of an appropriate server 102 for a given operation. Clients 106 running this software 250 may be referred to as "virtualization-aware clients" or "modified clients." Clients not running this software may be referred to as "virtualization-unaware clients" or "unmodified clients." FIG. 5 illustrates an exemplary configuration of a virtualization-aware client 106 and a virtualization-unaware client 106B according to one embodiment.

Typically, an unmodified client 106B will be running a standard protocol such as NFS or CIFS, sometimes as part of its operating system 130B. By re-exporting the virtualized file system from a virtualization-aware client 106 over a client-client network link 109D, a single virtual file system view may be provided to virtualization-unaware clients 106B. A virtualization-aware client 106 which re-export the file system in this way may be referred to as a "gateway" or "protocol translator" because it translates client requests from the NFS/CIFS protocol to a virtualization-aware protocol used by the servers 102. The virtualization-aware client 106 may use a client-server network link 109C to transmit the translated client requests and receive results from the server 102.

Individual namespaces of physical file systems 256 may be connected together at points where the parent directory of a file resides on a physical file system different from the one containing the file itself. For example, directory A may reside on server S1, and its subdirectory B may reside on server S2. In this example, the client 106 should contact server S1 when it needs to do a lookup in A, and it should contact server S2 when it needs to do a lookup in B. When the client 106 looks up B in A and gets a handle for B, the client 106 should also be instructed that any directory operations on B should be done by contacting server S2. Therefore, before server S1 returns the handle for B (as part of the lookup), server S1 needs to know that B actually resides on server S2. Namespace virtualization may enable these transactions. In one embodiment, all servers 102 that provide physical file systems 256 to the virtual file system 257 may run server-side virtualization software such as a virtualization layer 254. These servers 106 may be referred to as "virtualization-aware servers." In one embodiment, server-side virtualization software may be implemented primarily as a layer on top of underlying file system software.

As used herein, "cross file system transactions" include operations involving two or more physical file systems such as create, delete, mkdir, rmdir and rename. The most common case of cross file system transactions would be an mkdir operation across two physical file systems 256. As used herein, a "virtualization server-to-server protocol" 253 is the protocol between two virtualization-aware servers 102 for implementing cross file system transactions.

The virtual file system 257 includes metadata which are partitioned across the plurality of physical file systems 256 as discussed herein. The metadata may include information concerning the origin of data, the location of data, the hierarchy of data, and other relevant information. The metadata may be checked and/or validated using an operation referred to herein as a file system consistency check ("fsck"). In one embodiment, the metadata may include well-known data types such as inodes as well as other data structures such as inode lists. Although the following discussions may use modes and inode lists as examples of metadata, such use is not intended to be limiting, and other suitable metadata items may be used in a similar way.

In one embodiment, a unique and persistent inode number may be associated with each file and presented to the clients of the virtual file system 257. Therefore, any mechanism to associate inode numbers with files should guarantee the uniqueness of inode numbers across multiple physical file systems. The mechanism may further guarantee that the inode number does not change when a file migrates between physical file systems 256.

The virtual namespace may include a representation for directory entries which point to remote files. The virtual namespace may also include a representation for ".." of directories for cases where the parent directory is remote. The virtual namespace may maintain the link count for a directory even if it has remote subdirectories and/or a remote parent directory. Similarly, the reference count for a file may be correctly maintained even if one or more of its parent directories are remote.

In one embodiment, inode numbers may be 64 bits. In this case, the inode address space includes $2^{64}$ possible inode numbers from inode number 0 to inode number $2^{64}-1$. Generally, where inode numbers are n bits, the inode address space includes $2^n$ possible inode numbers. In the virtual namespace, this inode address space may be divided amongst the physical file systems 256 in the virtual file system 257. Ways of partitioning the inode address space may vary. In one embodiment, for example, the virtual namespace may support a maximum of 256 physical file systems, and the inode address space may be partitioned into 256 equal ranges, where each range includes $2^{56}$ possible inode numbers. Each physical file system may exclusively control one such range. In this example, because the physical file systems operate on mutually exclusive ranges, uniqueness of the inode numbers for each file system may be guaranteed.

Figure 6:
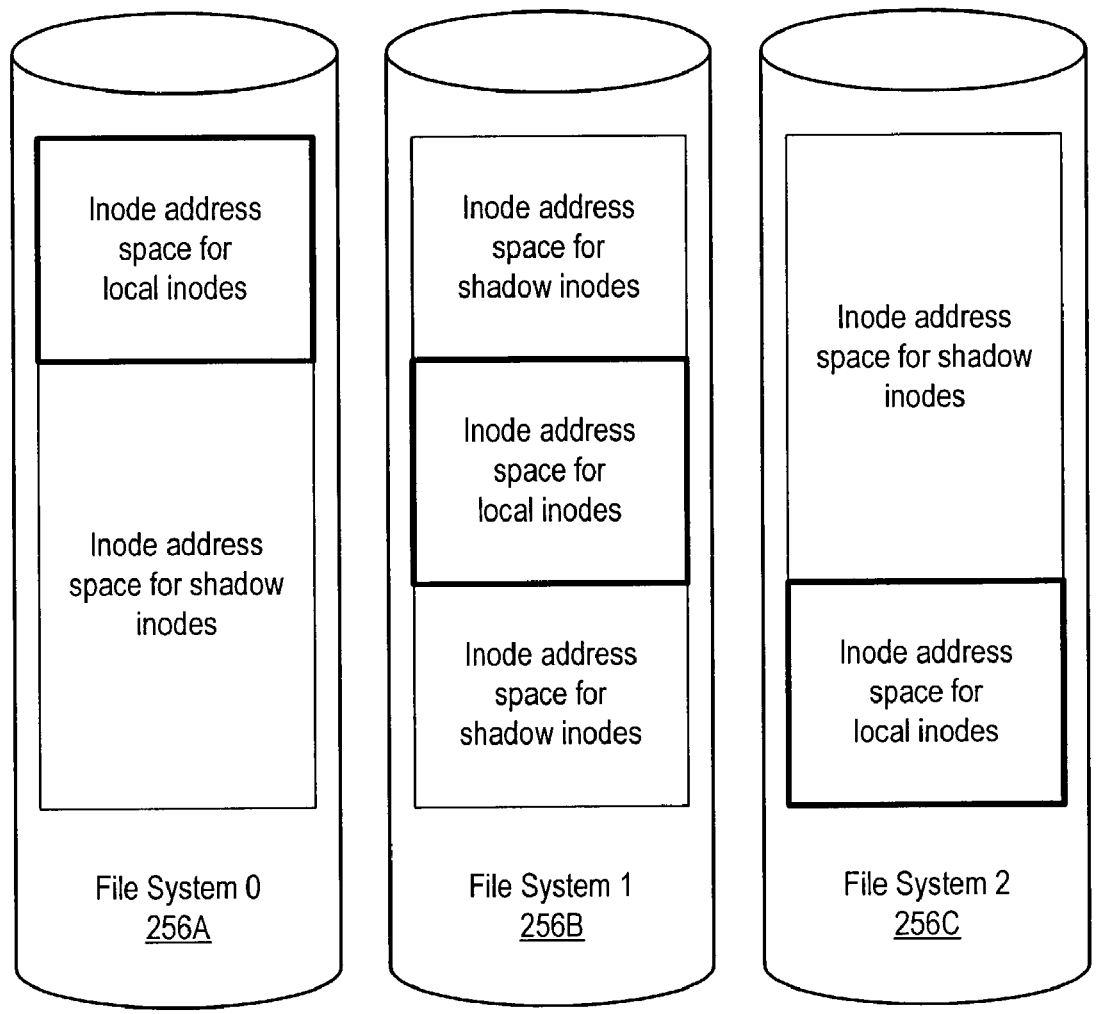
FIG. 6 illustrates an exemplary partitioning of inode address space in a partitioned file system according to one embodiment.

FIG. 6 illustrates an exemplary partitioning of inode address space in a partitioned file system according to one embodiment. The inode address space for the virtual file system is distributed evenly among each of three physical file systems 256. Each of the physical file systems 256A, 256B, and 256C is assigned a partition amounting to one-third of the inode address space. The remainder of the inode address space for a given physical file system 256 may be reserved for "shadowing" inodes of other physical file systems 256, as will be discussed below.

In one embodiment, a single logical inode list file may be divided up among multiple physical file systems 256. Each file system may maintain its own inode list file as a sparse file and may perform inode allocations only in the designated range. For example, physical file system 0 may control the inode address space <0 to $2^{56}-1>$, physical file system 1 may control the inode address space <$2^{56}$ to $2^{57}-1>$, and so on.

In one embodiment, the virtual file system 257 may use underlying directories of the physical file systems 256 rather than providing a directory structure of its own. The same directory may include entries for local and remote files. The distinction between local and remote files may be made by the virtual file system 257 based on the inode number of that file. In one embodiment, the virtual file system 257 may interpret the inode number in a directory entry as a global inode number with the first 8 bits identifying the physical file system. In one embodiment, as discussed above, physical file system id's may range from 0 to 255. In the examples discussed herein, a 64 bit inode number may be represented as a tuple <x, y>, where x represents the first 8 bits, and where y represents the rest of the number. In other words, x may identify the number of the physical file system.

For example, a virtualization-aware server on a physical file system 0 may resolve a file name "fileA" to an inode number <1, 100>. Because this indicates that the file is remote (it is resident on physical file system 1), the server may return the handle to the virtualization client. The client may then contact physical file system 1 to perform the desired operation.

In the previous example, "fileA" resides on file system 1, but its parent directory resides on file system 0. It may be desirable to use physical system structures like the directory to store this hierarchy information. Nevertheless, it may also be desirable to avoid burdening the physical file system with the notion of remote files. In one embodiment, therefore, whenever a directory entry points to a remote file, a "shadow inode" may be locally allocated with the same inode number as the remote file. Note that this shadow inode will be allocated outside the partition of inode address space which is controlled by the local file system. The local file system shadows the remote inode to avoid the potential inconsistency in directory structure if it stored a directory entry for "fileA" but no corresponding inode with that number. This mechanism assists in maintaining the local consistency of the file system.

The virtual file system lookup may essentially ignore the shadow inode when it is resolving a filename. In summary, therefore, a 64 bit inode number in a directory entry may be interpreted in two ways. The underlying physical file system 256 may interpret it as a traditional inode number (e.g., an offset in an inode list). The overlying virtual file system 257 may interpret it as a global inode number, where the first 8 bits (for example) identify the particular hosting physical file system 256.

Figure 7:
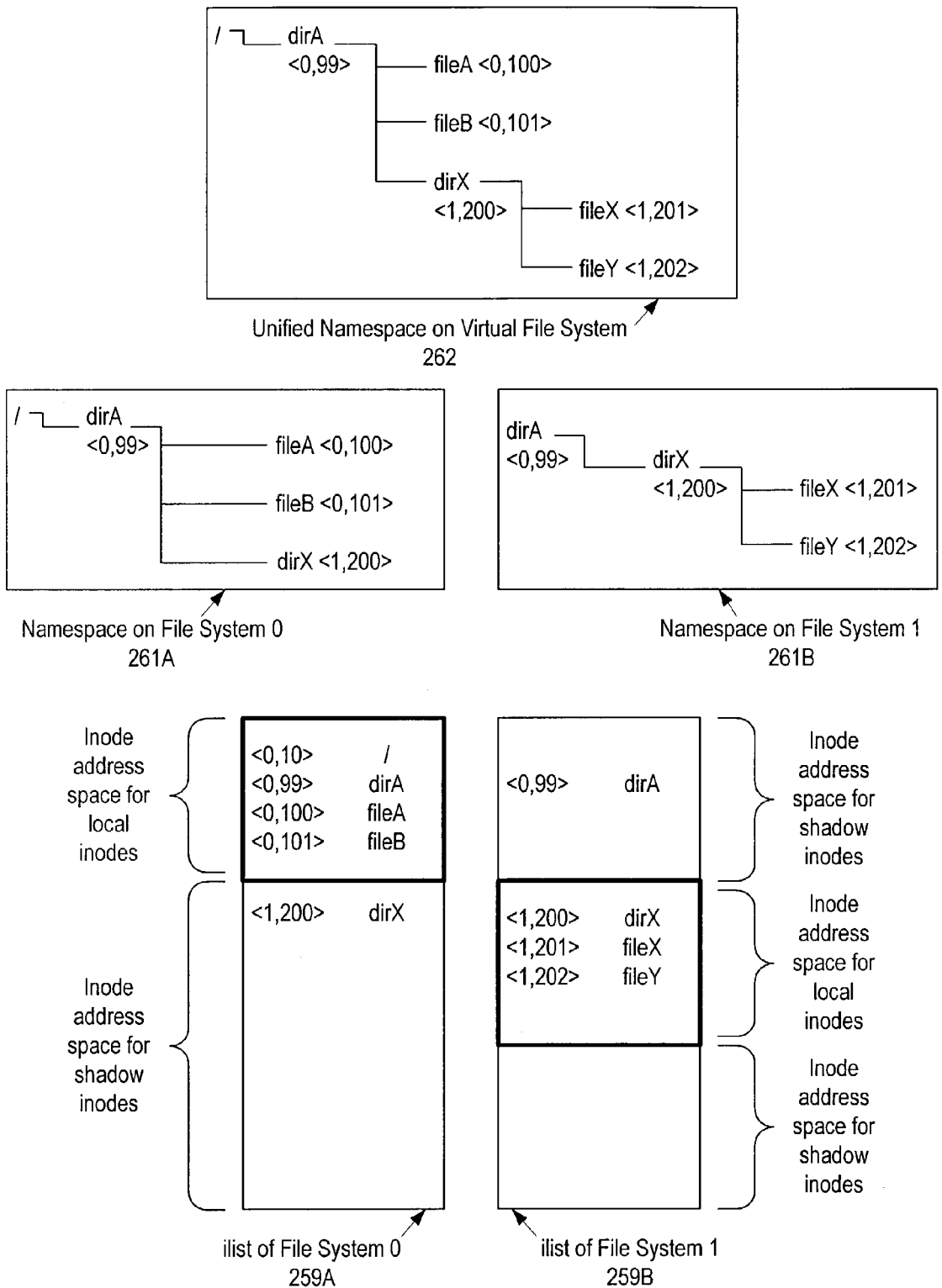
FIG. 7 illustrates an exemplary representation of remote files in a partitioned file system according to one embodiment.

FIG. 7 illustrates an exemplary representation of remote files in a partitioned file system according to one embodiment. As illustrated in the two inode lists 259, just as file system 0 maintains a shadow inode for dirX which resides on file system 1, file system 1 also maintains a shadow inode for dirA which resides on file system 0. Similarly, FIG. 7 illustrates the combination of two underlying namespaces 261 into a unified "virtual" namespace 262. In this example, dirX may be created as a subdirectory of dirA on file system 1. In general, any file with a remote parent directory may be created under the shadow inode of that directory on the local file system.

Shadow inodes may allow ".." information for directories to be correctly maintained without the virtual file system needing to maintain any extra information. In one embodiment, where a physical file system supports reverse pathname lookup, shadow inodes may also allow ".." information for regular files to be maintained correctly. The virtual file system may handle a lookup on ".." of such files just as it handles any lookup: by mapping the name ("..") to an inode number and interpreting that inode number as a global inode number.

Shadow inodes may allow the virtual file system to track reference counts on files correctly without having to maintain them separately from the physical file system. For instance, in the example in shown in FIG. 7, the reference count on "dirA" is expected to include the ".." reference from its subdirectory "dirX." Storing a shadow inode for "dirX" permits the reference count on "dirA" to be maintained correctly (from the point of view of the virtual file system). The same reference count may be interpreted in two ways. The physical file system may interpret it as a local reference to the file/directory. The virtual file system may interpret it as a global reference to that file/directory.

In one embodiment, shadow inodes may be distributed amongst a plurality of special directories on each physical file system. These special directories may be hidden from clients making requests through the virtualization layer 254.

In one embodiment, the file system consistency check (fsck) operation that is native to the underlying physical file systems need not be modified to be virtualization aware. When the full fsck on fsid N validates the directory "dirA", it will only verify the existence (locally) of inode number <1, 201>. Similarly, the full fsck on file system 1 will only verify that m ode number <1, 201> is pointed to by an entry in the directory <0, 99>. Therefore, the fsck operation may be performed independently on the underlying physical file systems.

In addition, a high-level fsck may be performed on the virtual namespace to validate the cross file system linkages in the namespace. Each physical file system may be offline and unavailable during the individual fsck on its partition of the namespace. However, the entire virtual file system need not be taken offline at the same time. Typically, the high-level fsck times are proportional to the number of cross links in the namespace. Because the number of cross file system linkages are typically small, the high-level fsck will usually take little time. Namespace virtualization may therefore improve the scalability and availability of a file system for metadata-intensive operations such as file system consistency checks.

As discussed above, inode allocations are limited to a part of the possible address space. Otherwise, operations that are local to the namespace of a single physical file system need no special handling or modification in one embodiment. These local operations are the bulk of file system operations in a typical network environment.

Virtualization-aware clients 106 may be provided a handle (in a manner similar to NFS) to identify files when exchanging messages with the server 102. Clients 106 may acquire these handles by performing lookups. In addition to the handle, a client 106 should be told which physical file system 256 hosts the desired file. In one embodiment, the identity of the hosting physical file system 256 may be embedded in the file handle; in another embodiment, the client 106 may acquire the identity through a separate protocol. The virtualization-aware servers 102 should map the handle to a file.

Figure 8:
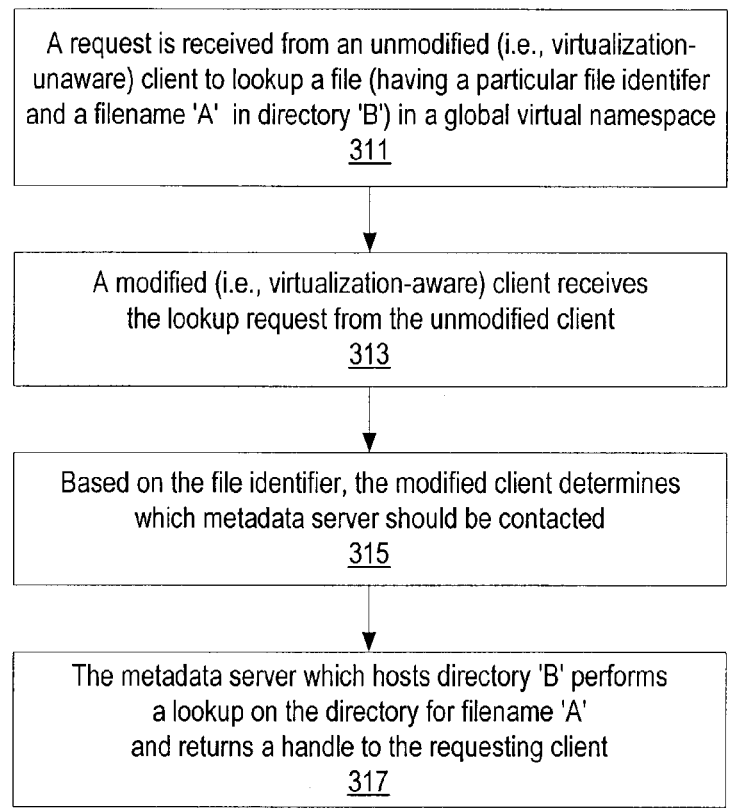
FIG. 8 is a flowchart which illustrates a method for client-server interaction in a virtual file system according to one embodiment.

FIG. 8 is a flowchart which illustrates a method for client-server interaction in a virtual file system according to one embodiment. A client (e.g., an unmodified or virtualization-unaware client) may generate a lookup request on a particular file in 311 in an attempt to perform a file-system operation on the file. The particular file in the global virtual namespace has a corresponding file identifier (e.g., a unique and persistent inode number) as well as a filename (e.g., 'A') and parent directory or path (e.g., 'B').

A modified (i.e., virtualization-aware) client may receive the lookup request from the unmodified client in 313. By examining the file identifier, the modified client may determine which metadata server should be contacted to process the lookup operation in 315. For example, the server may look at the top 8 bits of the inode to determine the appropriate server.

The appropriate metadata server (i.e., the server which hosts the parent directory 'B') may perform a lookup on the directory for filename 'A' in 317. The handle of the file may then be returned to the requesting client. The client may map this handle to the appropriate physical file system and proceed, for example, by performing a vget operation on that physical file system.

Migration of Data in a Partitioned File System

Virtualization may present a single namespace to clients 106 by distributing the namespace across multiple file systems on multiple servers 102. As new files are added to the namespace, they may be distributed across multiple file systems to prevent one file system from becoming a bottleneck. In one embodiment, newly created files may be placed on different file systems based on heuristics. These heuristics may take into account factors such as the current metadata load, space utilization, and the fact that a cross file system operation will typically be slower than a local operation. As more files are added and removed, the respective load on different file systems and servers may not remain balanced across the virtualized namespace. The load imbalance may saturate one specific file system and server, thereby resulting in undesirable system performance. To redistribute the load across available servers, the namespace may be repartitioned. Repartitioning may require the migrating of files across physical file systems.

Migration may be desirable in several scenarios: for example, to address a change in configuration, to address a change in load, for space management, or for administrative convenience. With an increasing load on the file server, more disks or more servers may be added to meet the increase in demand. To optimally utilize storage resources, the existing configuration may require repartitioning of the namespace after taking into account the new configuration. Similarly, a change in access pattern may require a repartitioning of the namespace in order to achieve optimal performance. To be able to redistribute the load through migration, the load on different parts of the namespace may be quantified. Once the load imbalance is quantified, heuristics may be used to identify subtrees for migration to get better load distribution across the global namespace. Extension of a file in the virtual file system may fail if we run out of space on one physical file system even though there is space on other file systems. Migration may be useful in balancing the free space across different file systems. If the global namespace can be mapped onto different file systems at a well-defined location (for example, a user's home directory), it may be easier to handle disk failure scenarios. Migration may help in isolating such problems to specific parts of the namespace.

By partitioning inode address space across different physical file systems 256, the virtualization layer 254 may ensure that each file system can generate unique inode numbers. Once an inode number has been allocated to a file, the inode number should remain associated with the file even if the file migrates to a different file system. Therefore, it is not recommended that the inode number contain location information.

In NFS, file handles exported by a file system typically contain the inode number along with the generation count. This information may help the file system to quickly locate the inode from the file handle. An NFS to virtualization translator may generate mappings from the NFS file handle to the physical file system and the inode number. These mappings may be maintained correctly for migrated files in the virtual file system.

While a subtree is being migrated from one file system to another, it is desirable that the components of the subtree remain accessible during migration. If a file needs to be made inaccessible for some time during migration, the duration should be independent of the size of the file. Because a subtree may remain accessible to clients during migration, it may therefore be possible for the subtree to be modified during migration. In one embodiment, the virtualization layer makes the migration completely transparent to the applications by keeping the virtual file system consistent.

After a server crash, a partially completed migration may be rolled back or rolled forward to leave the file system in a consistent state.

FIGS. 9A, 9B, and 9C illustrate examples of virtualization and migration of inodes in a partitioned file system according to one embodiment. To illustrate inode numbering issues and migration, FIGS. 9A, 9B, and 9C show an example of a subtree anchored at "A" containing two subdirectories "B" and "C". In this example, the global virtual namespace 262 file system is made up of two namespaces 261A and 261B for respective physical file systems FS0 and FS1.

FIG. 9A illustrates a scenario in which the entire subtree resides on one physical file system. FIG. 9B illustrates a scenario in which the subdirectory "C" is created remotely on FS1, while the subtree resides on FS0. The inode number for "C" has the tag 1 to identify the file system where it was created. FIG. 9C illustrates a scenario in which subdirectory "C" is created on FS0 but is migrated to FS1. The inode number for "C" has tag 0 to identify the file system where it was created.

As these scenarios show, it is possible to identify the location of an inode by inode number as long as it is not migrated. Once an inode is migrated to some other file system, it may be desirable to keep it allocated on the original file system. There are two reasons for doing this. First, the file system where this inode was created controls the allocation and deallocation of this inode number. Because this inode number is still in use (albeit migrated and on some other file system), it is desirable to keep this inode allocated so that its inode number does not get reused and cause consistency problems across the virtual namespace. Second, the inode number for "C" (which only contains information about where the file was created) will point to FS0. Any client while looking up "C" should be able to determine that the inode resides on FS1. In order to achieve this, the corresponding inode on FS0 should have the correct location information for "C".

Consider, for example, a simple configuration having only one file system (FS0) containing N files. To ease the load on this file system, another file system (FS1) may be added to the configuration. In this example, redistribution of load may result in the migration of half of the N files to the new file system. As discussed above, a lookup of any of the migrated files may involve first going to FS0 to find out the location information before retrieving the inode from FS1. In general, if there are M file systems having a total of N files, then N/(M+1) files will be migrated on average when a new file system is added to the configuration.

Location information for migrated files (i.e., files that are created on one file system and due to migration reside on some other file system) may be retrieved by contacting the creator file system. Therefore, access of such files may incur an extra hop. There are two approaches to mitigate this problem.

The first approach assumes that there would be a few remote files in the virtualized namespace. Whenever an inode needs to be looked up, the search may be started on the file system where the parent directory resides rather than on the file system where the inode was created. In the case of remote files, this heuristic will lead one to search on the wrong file system. At this point, the creator file system information embedded in the inode number (e.g., in the first 8 bits) may be used to locate the file system where the inode resides. This approach has the advantage of simplicity. Nevertheless, it works best when the total number of remote files remains a small percentage of the total virtualized namespace. Locating the file system where a remote file resides may require a trip through the file system where the file was created. This trip may increase the dependency between different components in the system constituting the namespace.

In the second approach, the location information may be embedded in the directory entry along with the inode number. In this manner, the location of the inode can be found by looking at the information in the directory. As discussed previously, the same inode number should be maintained after migration. These conditions may be met in the mechanism discussed as follows. The mechanism works by augmenting the inode number tuple by location information such that the new inode number looks like <current FS, creator FS, number>. The last two fields of this tuple are the same as described before and do not change with migration. After migration, only the first field of this tuple will change because it identifies the current location of the inode. In exporting an invariant inode number from this tuple, the location information may be dropped from the tuple. For directory entries, the inode numbers contain the location information for the inode; the inode numbers exported through the getattr or readdir interfaces contain the invariant portion of the inode number.

FIGS. 9D and 9E illustrate an example of migration of inodes in a partitioned file system according to one embodiment. Before migration, all the inodes get represented by a tuple of the form <0, n> because they all are created on FS0 and also reside on FS0. After migrating "C" to FS1, it will be represented by the tuple <1, 0, 102>. In this mechanism, the inode number exported to the outside world will continue to be <0, 102> for "C". This mechanism has the advantage of not requiring any additional hops since the location information is embedded in the directory entry.

In addition to migrating invariant inodes as discussed previously, subtrees may be migrated in one embodiment. A subtree may be migrated from top to bottom or from bottom to top. When migrating top down, the directories will migrate first; therefore, the metadata load will get distributed to other nodes before the effects of file migration on space can be seen. When migrating bottom up, the leaf nodes (e.g., files) will get migrated first, and the effect will be the opposite of the top-down approach.

As discussed previously, virtualization may use the directory structure of the underlying file system for storing directory entries. While migrating a directory from one file system to another, directory entries stored in the underlying physical file system should be migrated. While doing this, the underlying physical file system should be kept structurally consistent (e.g., to avoid the need for a full, namespace-wide fsck during recovery). In one embodiment, therefore, directories may be migrated entry by entry since access to the directory should not be denied during migration.

The following example will proceed through steps for migrating a directory "A" from a file system FS0 (file system 0) to FS2 (file system 1) according to one embodiment. The example may be employed in a suitable modern file system such as VERITAS File System™ from VERITAS® Software Corporation. VERITAS File System™ is a modern file system organization that supports enterprise-class file storage requirements. VERITAS File System™ adds journaling or intent-logging to increase reliability. VERITAS File System™ uses more efficient, extent-based allocation policies as well as layout and caching modifications to more closely meet the I/O requirements of commercial applications and databases. VERITAS File System™ includes a utility set that allows most common administrative functions to be performed online and without any risk to user data or metadata consistency.

The example directory was created on FS1 with inode number <0, 0, 100> and will be migrated to FS1 as inode number <1, 0, 100>. For purposes of this example, an inode numbering mechanism will be used which records the location information in the directory entry.

First, the directory "A" under migration is marked as such by recording its identity under a special directory (e.g., directory "undermigration") on file system FS0. Second, inode <1, 0, 100> is created in a scratch directory on file system FS1. Third, directory entries on FS0 are read in block size units. Fourth, the entries in the directory block are scanned. For each entry, the following steps are performed: the directory on FS0 is locked; a lookup is performed for the directory entry to ensure that it exists before creating it on FS1; and the lock on the directory on FS0 is dropped. The process may continue until all the blocks in the directory are migrated to FS1.

During migration, access to the directory is not blocked, and applications may add or delete entries to the directory. These operations may be duplicated on the remote directory for the duration of migration. Both creation and removal may be performed first on FS0, then on FS1.

With respect to the placement of a directory and its contained files, several different scenarios may be encountered. In the following example, assume that there is a subdirectory "B" in the directory "A" (wherein the directory "A" is under migration). In a first scenario, both "A" and "B" reside on FS0. While migrating the directory entry for "B", a shadow inode for "B" will be created on FS1 which will be pointed to by the migrated entry for "B." In a second scenario, "A" resides on FS0 while B resides remotely on FS2. This scenario may be treated in a similar to the first scenario. In a third scenario, "A" resides on FS0, and "B" resides on FS1 (the file system to which "A" is being migrated). On FS0, the inode number for "A" was <0, 0, 100>, which will become <1, 0, 100> when it gets migrated to FS1. Before "A" is migrated, the parent directory of "B" on FS1 will be <0, 0, 100>. When migrating the directory entry for "B," the directory should be renamed to be under the directory <1, 0, 100>. This may have a side effect of changing the ".." entry for "B" before the migration is complete. In this case, the ".." entry for "B" may contain the correct inode number but incorrect location information. Virtualization-aware clients, while trying to lookup "..", will resolve it to <1, 0, 100> on FS1 which will direct it to the correct inode number <0, 0, 100> on FS0.

In one embodiment, the migration thread may be initiated on the node which serves file system FS0. If this node crashes, the recovery of this node may trigger a cleanup for all the directories which were being migrated from FS0. The information about directories under migration can be looked up under the special directories (e.g., "undermigration") on FS0 and can be cleaned up during recovery. During recovery, the changes performed in migrating the directory may be rolled back. The migration may be attempted again from the beginning.

Cross File System Transactions

Cross file system transactions may include file system operations involving two or more physical file systems. For example, operations such as create, delete, mkdir, rmdir, and rename may be cross file system transactions when the operations involve more than one physical file system. An mkdir where the parent directory resides on one file system and the directory to be created on another is a typical example of a cross file system transaction. Virtualization-aware clients may send requests which span two or more servers to one of the servers involved. Usually, the recipient server is the server that hosts the directory where the new file is to be created (or removed, or linked, etc.). The recipient server may then coordinate with the other appropriate server(s) using a server-to-server protocol to complete the request.

In one embodiment, cross file system transactions are completed atomically to preserve the single file system semantics for clients of the virtual file system. The in-between state of a transaction is not visible to clients, even in the event of a file system(s) crash, while the cross file system transaction is in progress. Further, any resources which are allocated on nodes during the execution of these transactions (for example, inodes allocated during an interrupted cross file system create) may be cleaned up when the virtual file system recovers from the crash.

In order to recover and cleanup from crashes, cross file system transactions may record their state in a persistent manner. In one embodiment, this recording of state may be implemented using an extended operation (or "extop") mechanism provided by an underlying layer of the file system (e.g., the VERITAS File System™ available from VERITAS® Software Corporation). Using this mechanism, new extended operation flags may be added to the inode. The flags may be set and reset atomically through a transaction. A mount operation may let the virtual file system handle the new extended operations once the virtual file system has finished handling its own extended operations. In doing so, the virtual file system may register a callback function for each new extended operations it introduces. These callback functions may then be called while proceeding through the list of inodes with pending extended operations.

In the following example of a cross file system transaction, FS0 hosts directory dirA, and FS0 seeks to create a directory dirB on file system FS1. First, FS0 may request FS1 to create a shadow directory for dirA (unless one already exists), allocate an inode (type directory) with an IEREMOVE extended operation, and set and send back the inode number of this new inode. Once it gets the inode number, FS0 may allocate an inode with this number with IEREMOVE set. FS0 may then set the new extended operation IERCREATE on it. Finally, FS0 may link in this inode under dirA, thereby turning off the IEREMOVE extended operation but leaving on the IERCREATE extended operation. FS0 may then request FS1 to commit the create by linking in dirB under shadow inode for dirB. This operation may turn off the IEREMOVE flag on dirB. Once it gets the acknowledgement for the earlier request, FS0 may turn off the IERCREATE flag on the shadow inode for dirB.

In the above example, the new extended operation IERCREATE may be handled as follows. The inode on file system 1 may be checked to see if it is allocated. If so, FS1 may be requested to remove it. The corresponding file may then be removed on FS0.

In the following example of a cross file system transaction, FS0 hosts directory dirA and needs to remove fileA on FS1. First, FS0 may set the new extended operation IEREMOVE on the shadow inode of fileA. Second, FS0 may ask FS1 to remove fileA. Third, FS0 may removes the shadow inode of fileA from dirA. The new extended operation IEREMOVE may be handled by removing the remote inode (if it isn't already removed) and then removing the local inode.

In the following example of a cross file system transaction, FS0 hosts directory dirA and needs to make a hard link to a file fileA. FileA resides in directory dirB. Both dirB and the file are hosted on FS1. First, shadow inode is allocated for fileA, the new extended operation IERLINK is set on it. FS1 may then be requested to create a shadow inode for dirA (unless one already exists) and create a hard link to fileA from this directory. After it gets an acknowledgement for the previous message, FS0 may turn off the IERLINK flag on the shadow inode for fileA. The new extended operation IERLINK may be handled as follows. The remote inode may be checked to see if it exists in directory dirA with the same name as the shadow inode for that file. If the remote inode exists, then it may be unlinked. The local inode may then be unlinked. Note that the link count on fileA may correctly represent the number of hard links to the file in the virtual file system.

Recovery from Failures

Because the virtual file system has its own metadata, it may be desirable to recover this metadata to a consistent state in the event of a failure. Generally speaking, failures may be classified into three categories.

First, full failures may include failures like loss of power to the appliance. These failures typically involve substantially all of the physical file systems failing at once. Each physical file system may recover from such failures by doing a log replay. The expectation is that such errors are the most common category. Recoveries from full failures are typically quick.

Second, partial failures may involve one or more physical file systems failing and then coming back up. In one embodiment, the virtual file system may appropriately handle cross file system operations (e.g., by postponing such operations or returning an error) while one of the physical file systems is down. Again, it is assumed that the physical file system has done a log replay to recover.

Third, when the physical file system has run a full fsck, virtual file system metadata that are stored within the physical file system may potentially be thrown away.

Virtual file system recovery may start after all the available physical file systems have finished their recovery. Note that the physical file system recoveries can happen in parallel since they are independent of each other. If a physical file system full fsck has not been run, and if all the file systems are available, virtual file system metadata may be restored to a consistent state by completing the new extended operations as discussed with reference to cross file system transactions.

If, however, the physical file system full fsck has been run, then the virtual file system may run its own equivalent of full fsck to verify the consistency of its metadata. The major part of this metadata will comprise cross file system linkages. As discussed previously, the cross file system linkages are represented by shadow inodes. In order to verify the virtual file system metadata, it is expected that the fsck will only need to process these shadow inodes. It is further expected that the virtual file system full fsck will be quick in duration because the number of such shadow inodes is expected to be small and restricted to a well defined part of the inode address space.

If a single physical file system has been full fsck'd, then the virtual file system fsck may go through the shadow inode address space of that file system as well as part of the shadow inode address space of each of the other file systems (i.e., the part that has shadow inodes pointing to this file system). This mechanism may provide a quick way to discover cross file system linkages without walking the namespace. This mechanism may therefore improve the scalability and response time of high-level consistency checks in the global namespace.

Figure 10:
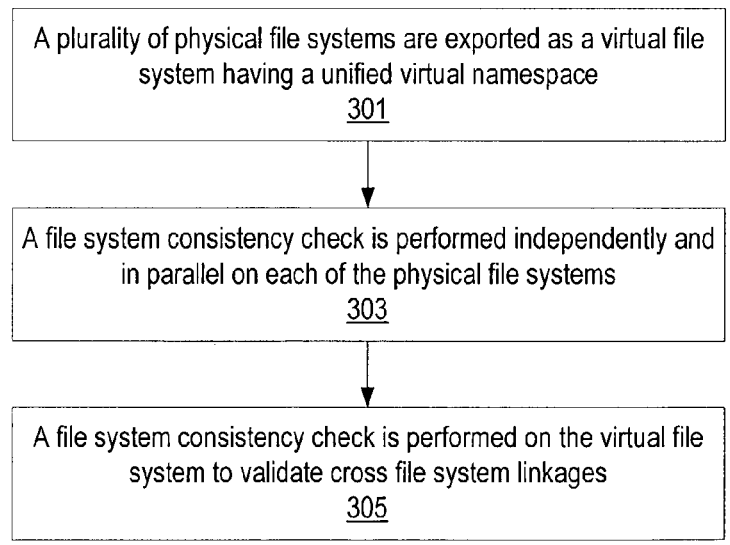
FIG. 10 is a flowchart which illustrates a method for partitioning a file system to distribute the load of performing file system consistency checks according to one embodiment.

FIG. 10 is a flowchart which illustrates a method for partitioning a file system to distribute the load of performing file system consistency checks according to one embodiment. A plurality of physical file systems may be exported to clients as a virtual file system having a unified virtual namespace in 301. Each physical file system may be responsible for a partition of the metadata of the virtual namespace. A file system consistency check may be independently performed on each of the physical file systems in 303. The independent consistency checks may be used to independently validate each respective partition of the metadata. The independent consistency checks may be performed in serial or in parallel, and they may be performed for some, but not all, of the physical file systems and respective partitions of metadata. Finally, a file system consistency check may be performed on the virtual file system in 305. This "higher-level" consistency check may be used to validate the linkages between physical file systems (usually resulting from cross file system transactions).

Backup of a Virtual File System

It may be desirable for the virtual file system to be capable of being backed up. Therefore, the virtual file system may provide a mechanism by which the backup utility can backup the data from a stable and consistent image of the file system. One way to provide a stable image for backup is to support clones with the virtual file system. Backing up from the stable image may be performed by backing the data through a client. However, this operation would require all the data to be routed through a single client. In another approach, the backup server would know about the location of the server and would let the subtree get backed up directly from the server (e.g., through NDMP).

Embodiments Using VERITAS File System™

In various embodiments, the virtual and/or physical file systems may include the VERITAS File System™ available from VERITAS® Software Corporation or equivalent solutions.

In one embodiment using VERITAS File System™ or an equivalent, a single global quota limit per user (or group) may be enforced across multiple file systems. Allocations and deallocations across multiple file systems may be tracked per user to enforce quota limits. The VERITAS File System™ may update the usage information transactionally with block allocations and deallocations. One approach under VERITAS File System™ is to designate one of the servers as a quota server. The quota server may be contacted for all allocations and deallocations. Another possible approach is to split the global quota limit of each user across multiple file systems based on some estimate of their usage. If allocations on a file system fail because they exceed the quota limit on that file system, the global quota limit may be redistributed and the allocation retried.

Versions of VERITAS File System™ may provide cloning functionality. When a partitioned namespace includes multiple file systems, it may be desirable for any cloning functionality to be split across the multiple file systems.

Embodiments Using Clustered File System

In various embodiments, the virtual and/or physical file systems may include VERITAS Cluster File System™ (CFS) software (available from VERITAS® Software Corporation) or equivalent solutions. In CFS, the primary node performs most of the metadata operations while a secondary node uses the primary (through RPC messages) for most of the metadata operations. As more secondary nodes are added to the cluster, the primary starts seeing increased load and eventually becomes a bottleneck for the system performance.

By splitting the load to multiple file systems and distributing the primary responsibility to different nodes, it may be possible to increase the scalability of CFS configurations. From a manageability perspective, however, it may be more convenient if the NFS/CIFS clients of the CFS nodes see a single virtual namespace. Namespace virtualization may be achieved by adding a virtualization layer (as described at length above) over CFS to export a single namespace across multiple file systems.

In one embodiment, CFS has a shared storage model in which all the nodes expect to see all the disks in the cluster. This model can be useful for virtualization in following ways. First, due to the tightly coupled nature of a cluster, it is unlikely that CFS clients will be configured to be part of the cluster. Substantially the only way in which CFS clients can access files from a cluster is through well known protocols such as CIFS or NFS. For CFS, therefore, it may not be necessary to run a virtualization-aware client outside of the cluster. Because each node of the cluster is exporting the entire global namespace, each one of these nodes would be running the client-side virtualization code also.

With CFS, all the physical file systems in the virtual file system may be mounted on all the nodes (either as primary or as secondary). Many server/server interactions or client/server communications for the virtualization layer may be performed by allowing the underlying CFS messaging to handle communication between different nodes in the cluster. Messaging primitives for the virtualization layer can exploit the RPC layer in CFS for exchanging messages. In other words, because all physical file systems and files are accessible on all the CFS nodes, the operations of the virtualization layer may be simplified.

The entire namespace may be partitioned into multiple file systems, and the primary responsibility (in CFS terms) may therefore be distributed across different nodes. If the load on the namespace does not remain balanced, the load can be balanced to a degree by abdicating the responsibility of being the primary node for some file systems. While abdication of the primary responsibility for one or more nodes would not provide as much control as migration, the abdication method would not be as metadata-intensive an operation as migration.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system comprising:
   one or more server computer systems, wherein each of the one or more server computer systems comprises a respective processor and a respective memory; and
   one or more nonvolatile storage devices, wherein the one or more nonvolatile storage devices store a plurality of physical file systems which are hosted by the one or more server computer systems;
   wherein the plurality of physical file systems are accessible through a virtual file system having a namespace, wherein the virtual file system includes metadata which are partitioned across the plurality of physical file systems, wherein a respective partition of the metadata of the virtual file system is stored on each of the one or more nonvolatile storage devices;
   wherein the one or more server computer systems are configured to:
      independently perform a file system consistency check on each of the physical file systems to independently validate each partition of the metadata;
      determine a plurality of links between the physical file systems by determining a plurality of shadow file identifiers, wherein each of the shadow file identifiers comprises a placeholder in a respective one of the physical file systems for a remote file stored in a respective different one of the physical file systems; and
      perform a file system consistency check to validate metadata comprising the links between the physical file systems.

2. The system of claim 1, further comprising:
   a client computer system which is communicatively coupled to the one or more server computer systems via a network, wherein the client computer system is operable to:
      receive a request to perform a lookup operation on a file in the namespace, wherein the request comprises a filename and parent directory for the file, and wherein the metadata for the virtual file system comprises a plurality of file identifiers including a corresponding file identifier for the file; and
      selecting one of the one or more server computer systems to process the lookup operation;
   wherein the selected server computer system is operable to:
      perform a lookup on the parent directory to determine a handle for the file, wherein the parent directory is hosted by the selected server computer system; and
      return the handle for the file to the client computer system.

3. The system of claim 1,
   wherein the metadata are re-partitionable across the plurality of physical file systems.

4. The system of claim 1,
   wherein the metadata for the virtual file system comprise a plurality of unique inodes.

5. The system of claim 1,
   wherein an address space for file identifiers comprises an address space for the shadow file identifiers in each of the respective plurality of physical file systems;
   wherein the one or more server computer systems are configured to determine the plurality of links between the physical file systems by walking the address spaces for the shadow file identifiers.

6. A method comprising:
   exporting a plurality of physical file systems as a virtual file system with a namespace, wherein the plurality of physical file systems are stored on one or more nonvolatile storage devices, wherein the virtual file system includes metadata which are partitioned across the plurality of physical file systems, wherein a respective partition of the metadata of the virtual file system is stored on each of the one or more nonvolatile storage devices;
   independently performing a file system consistency check on each of the physical file systems to independently validate each partition of the metadata;
   determining a plurality of links between the physical file systems by determining a plurality of shadow file identifiers, wherein each of the shadow file identifiers comprises a placeholder in a respective one of the physical file systems for a remote file stored in a respective different one of the physical file systems; and performing a file system consistency check to validate metadata comprising the links between the physical file systems.

7. The method of claim 6, further comprising:
re-partitioning the namespace into a different plurality of partitions.

8. The method of claim 6, further comprising:
receiving a request from a client computer system to perform a lookup operation on a file in the namespace, wherein the request comprises a filename and parent directory for the file, and wherein the metadata for the virtual file system comprises a plurality of file identifiers including a corresponding file identifier for the file;
selecting a server computer system to process the lookup operation;
performing a lookup on the parent directory to determine a handle for the file, wherein the parent directory is hosted by the selected server computer system; and
returning the handle for the file to the client computer system.

9. The method of claim 6,
wherein an address space for file identifiers comprises an address space for the shadow file identifiers in each of the respective plurality of physical file systems; and
wherein determining the plurality of links between the physical file systems comprises walking the address spaces for the shadow file identifiers.

10. The method of claim 6, further comprising:
moving a file from a source physical file system to a destination physical file system; and
assigning to the moved file a file identifier in the destination physical file system.

11. The method of claim 6,
wherein the metadata for the virtual file system comprise a plurality of unique inodes.

12. A computer-readable storage medium comprising program instructions, wherein the program instructions are computer-executable to implement:
exporting a plurality of physical file systems as a virtual file system with a namespace, wherein the plurality of physical file systems are stored on one or more nonvolatile storage devices, wherein the virtual file system includes metadata which are partitioned across the plurality of physical file systems, wherein a respective partition of the metadata of the virtual file system is stored on each of the one or more nonvolatile storage devices;
independently performing a file system consistency check on each of the physical file systems to independently validate each partition of the metadata;
determining a plurality of links between the physical file systems by determining a plurality of shadow file identifiers, wherein each of the shadow file identifiers comprises a placeholder in a respective one of the physical file systems for a remote file stored in a respective different one of the physical file systems; and
performing a file system consistency check to validate metadata comprising the links between the physical file systems.

13. The computer-readable storage medium of claim 12, wherein the program instructions are further computer-executable to implement:
re-partitioning the namespace into a different plurality of partitions.

14. The computer-readable storage medium of claim 12, wherein the program instructions are further computer-executable to implement:
receiving a request from a client computer system to perform a lookup operation on a file in the namespace, wherein the request comprises a filename and parent directory for the file, and wherein the metadata for the virtual file system comprises a plurality of file identifiers including a corresponding file identifier for the file;
selecting a server computer system to process the lookup operation;
performing a lookup on the parent directory to determine a handle for the file, wherein the parent directory is hosted by the selected server computer system; and
returning the handle for the file to the client computer system.

15. The computer-readable storage medium of claim 12,
wherein an address space for file identifiers comprises an address space for the shadow file identifiers in each of the respective plurality of physical file systems; and
wherein determining the plurality of links between the physical file systems comprises walking the address spaces for the shadow file identifiers.

16. The computer-readable storage medium of claim 12, wherein the program instructions are further computer-executable to implement:
moving a file from a source physical file system to a destination physical file system; and
assigning to the moved file a file identifier in the destination physical file system.

17. The computer-readable storage medium of claim 12,
wherein the metadata for the virtual file system comprise a plurality of unique inodes.

18. A system comprising:
means for exposing a plurality of physical file systems as a virtual file system with a namespace, wherein the plurality of physical file systems are stored on one or more nonvolatile storage devices, wherein the virtual file system includes metadata which are partitioned across the plurality of physical file systems, wherein a respective partition of the metadata of the virtual file system is stored on each of the one or more nonvolatile storage devices;
means for independently performing a file system consistency check on each of the physical file systems to independently validate each partition of the metadata;
means for determining a plurality of links between the physical file systems by determining a plurality of shadow file identifiers, wherein each of the shadow file identifiers comprises a placeholder in a respective one of the physical file systems for a remote file stored in a respective different one of the physical file systems; and
means for performing a file system consistency check to validate metadata comprising the links between the physical file systems.

* * * * *

UNITED STATES PATENT AND TRADEMARK OFFICE
CERTIFICATE OF CORRECTION

PATENT NO.      : 7,653,699 B1                                                Page 1 of 1
APPLICATION NO. : 10/460148
DATED           : January 26, 2010
INVENTOR(S)     : Colgrove et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1521 days.

Signed and Sealed this

Twenty-third Day of November, 2010

David J. Kappos
*Director of the United States Patent and Trademark Office*